United States Patent
Sakai

(10) Patent No.: US 10,161,959 B2
(45) Date of Patent: Dec. 25, 2018

(54) ATOMIC FORCE MICROSCOPE AND CONTROL METHOD OF THE SAME

(71) Applicant: OLYMPUS CORPORATION, Tokyo (JP)

(72) Inventor: Nobuaki Sakai, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/848,217

(22) Filed: Dec. 20, 2017

(65) Prior Publication Data

US 2018/0120343 A1    May 3, 2018

Related U.S. Application Data

(63) Continuation of application No. PCT/JP2015/069553, filed on Jul. 7, 2015.

(51) Int. Cl.
*G01Q 10/06* (2010.01)
*G01Q 60/24* (2010.01)
*G01Q 60/32* (2010.01)

(52) U.S. Cl.
CPC ........... *G01Q 10/06* (2013.01); *G01Q 10/065* (2013.01); *G01Q 60/24* (2013.01); *G01Q 60/32* (2013.01)

(58) Field of Classification Search
CPC ...... G01Q 10/06; G01Q 10/065; G01Q 60/24; G01Q 60/32
See application file for complete search history.

(56) References Cited

U.S. PATENT DOCUMENTS

| | | | |
|---|---|---|---|
| 2009/0032706 A1 | 2/2009 | Prater et al. | |
| 2011/0247106 A1* | 10/2011 | Humphris | G01Q 10/065 850/6 |
| 2012/0131702 A1* | 5/2012 | Shi | G01Q 10/065 850/1 |

FOREIGN PATENT DOCUMENTS

| | | |
|---|---|---|
| JP | 4083517 B2 | 4/2008 |
| JP | 5079109 B2 | 11/2012 |

OTHER PUBLICATIONS

English translation of International Preliminary Report on Patentability dated Jan. 18, 2018 together with the Written Opinion received in related International Application No. PCT/JP2015/069553.

(Continued)

*Primary Examiner* — Jason McCormack
*Assistant Examiner* — Sean Luck
(74) *Attorney, Agent, or Firm* — Scully, Scott, Murphy & Presser, P.C.

(57) ABSTRACT

An atomic force microscope acquires sample information by performing relative raster scanning between a cantilever and a sample across an XY-plane, while causing an interaction to be generated between a probe provided at a free end of the cantilever and the sample. The atomic force microscope includes a raster-scanning-information generator to generate raster scanning information, a raster-scanning controller to control the raster scanning based on the raster scanning information, and an interaction controller to control strength of the interaction based on the raster scanning information. The interaction controller relatively reduces the strength of the interaction, when a relative speed between the cantilever and the sample across the XY-plane of the raster scanning relatively decreases.

14 Claims, 7 Drawing Sheets

(56) References Cited

OTHER PUBLICATIONS

International Search Report dated Oct. 6, 2015 issued in PCT/JP2015/069553.
Ando, T, "High-Speed Imaging Apparatus for Viewing Nanometer-Scale Dynamics of Protein", Journal of the Japan Society of Precision Engineering, 2006, vol. 72, No. 11, The Japan Society for Precision Engineering, pp. 1315-1318.

* cited by examiner

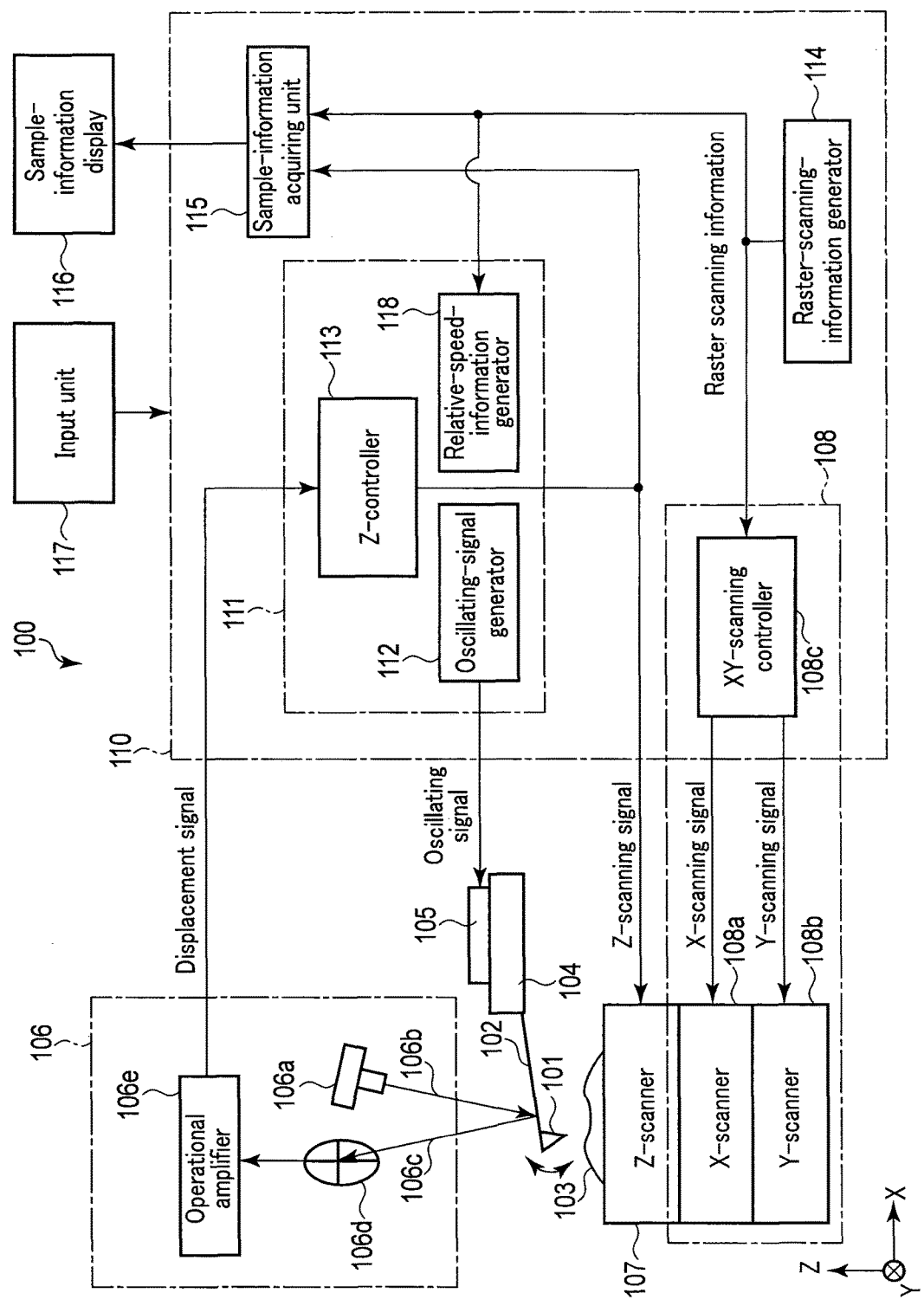
F I G. 1

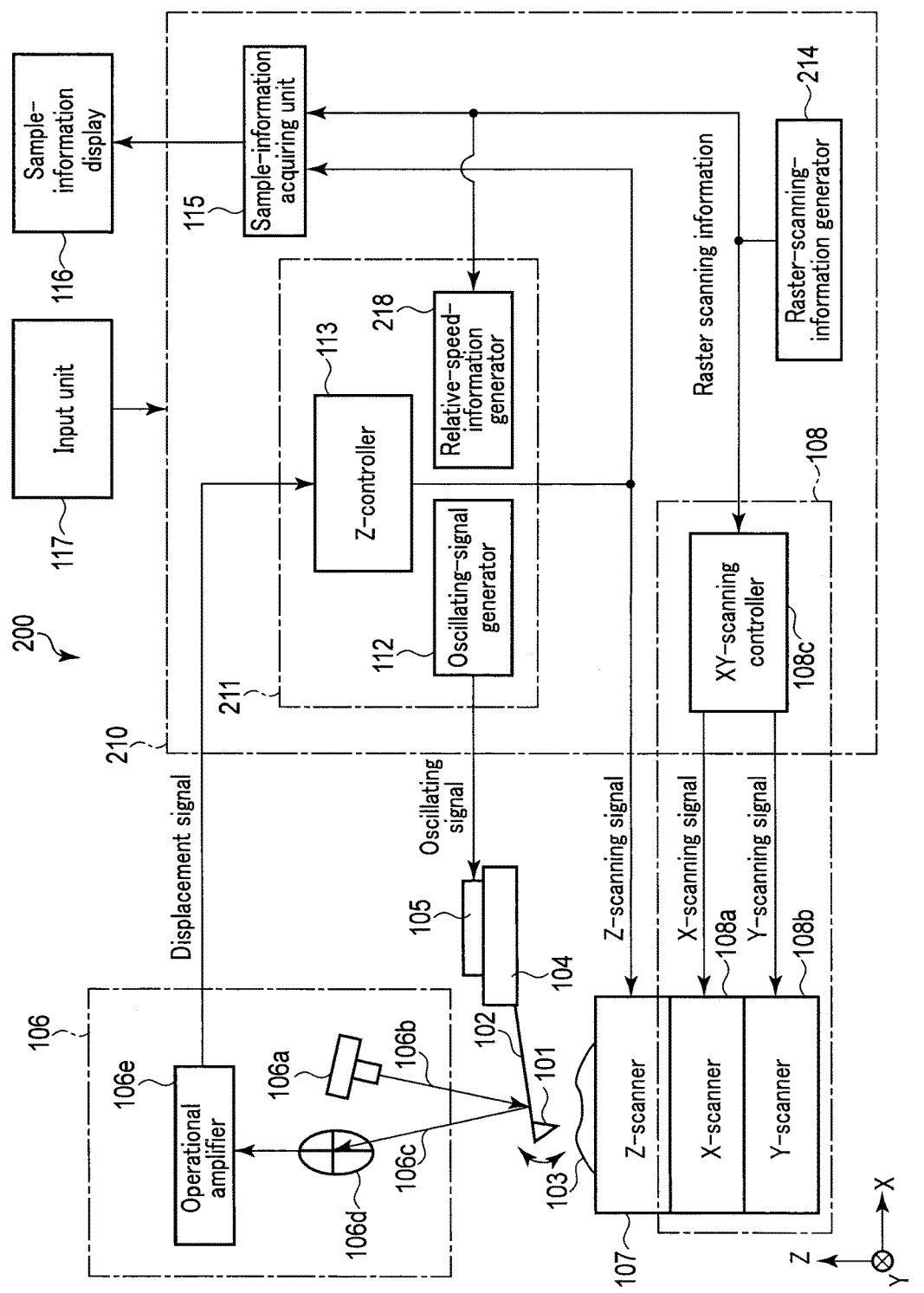
F I G. 9

ATOMIC FORCE MICROSCOPE AND CONTROL METHOD OF THE SAME

CROSS REFERENCE TO RELATED APPLICATIONS

This application is a Continuation Application of PCT Application No. PCT/JP2015/069553, filed Jul. 7, 2015, the entire contents of which are incorporated herein by reference.

BACKGROUND OF THE INVENTION

1. Field of the Invention

The present invention relates to scanning probe microscopes, in particular, atomic force microscopes for use in observation of living body samples.

2. Description of the Related Art

The scanning probe microscope (SPM) is a scanning microscope that mechanically scans a mechanical probe to acquire information on a sample surface, and is a common name for a scanning tunneling microscope (STM), an atomic force microscope (AFM), a scanning magnetic force microscope (MFM), a scanning capacitance microscope (SCaM), a scanning near-field optical microscope (SNOM), and the like.

The scanning type probe microscope acquires desired surface information on the sample through the mechanical probe while raster scanning a mechanical probe and a sample relatively in an XY direction to map and display the information on a display. Of these, the atomic force microscope (hereinafter, referred to as AFM), which is the most widely used device, comprises a cantilever having a mechanical probe at its free end, an optical displacement sensor to detect a displacement of the cantilever, and a scanner to relatively scan the cantilever and a sample. The AFM causes a mechanical interaction to be generated between the mechanical probe and the sample to acquire information on the sample based on deformation of the cantilever caused by the mechanical interaction.

Recently, a soft matter observation AFM to observe, in a liquid, soft samples such as a biological sample and a gel is receiving attention. In a soft matter observation AFM, how small an influence on a sample can be reduced, specifically, how small deformation of the sample resulting from a mechanical interaction acting between a mechanical probe and the sample can be reduced, is important. In a conventional soft matter observation AFM, as shown in, for example, Japanese Patent No. 4083517, reduction of the interaction is aimed by contriving closed loop control for keeping a distance between a cantilever and a sample constant.

BRIEF SUMMARY OF THE INVENTION

The present invention is directed to an atomic force microscope to acquire sample information by performing relative raster scanning between a cantilever and a sample across an XY-plane, while causing an interaction to be generated between a probe provided at a free end of the cantilever and the sample. The atomic force microscope includes a raster-scanning-information generator to generate raster scanning information, a raster-scanning controller to control the raster scanning based on the raster scanning information, and an interaction controller to control strength of the interaction based on the raster scanning information. The interaction controller relatively reduces the strength of the interaction, when a relative speed between the cantilever and the sample across the XY-plane of the raster scanning relatively decreases.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 shows an atomic force microscope of a first embodiment;

FIG. 9 shows an atomic force microscope of a second embodiment;

DETAILED DESCRIPTION OF THE INVENTION

First Embodiment

Figure 2:
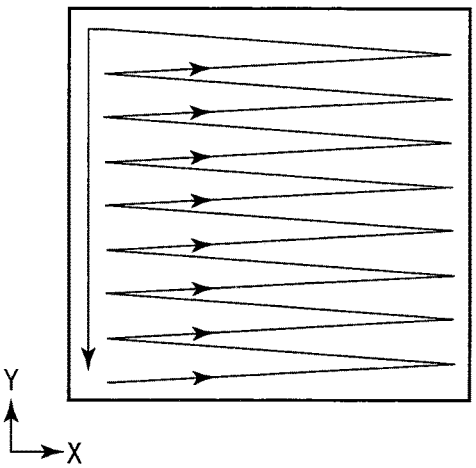
FIG. 2 shows a locus of relative raster scanning of a probe with respect to a sample.

In soft samples such as a gel, there is a tendency in that deformation of the sample becomes larger as the time during which the interaction between a probe and the sample acts becomes longer.

A time during which the interaction acts is considered to be a time during which the probe passes through a unit length across an XY-plane of a sample surface. The time during which the probe passes through the unit length across the XY-plane of the sample surface is equal to an inverse of a relative speed between the probe and the sample across the XY-plane. That is, the time during which the interaction acts is inversely proportional to the relative speed between the probe and the sample across the XY-plane. Therefore, the tendency in that the deformation of the sample becomes larger as the time during which the interaction acts becomes longer can be stated as a tendency in that the deformation of the sample becomes larger as the relative speed between the probe and the sample becomes smaller. Note that the relative speed between the probe and the sample is equivalent to a relative speed of the cantilever and the sample.

This tendency causes a problem that if a scanning area of raster scanning is reduced, or if the scanning frequency is decreased, the relative speed between the probe and the sample decreases, resulting in an increase in the deformation of the sample. This is a significant problem in soft matter observation AFMs to observe soft samples such as a gel.

A first embodiment solves this problem, and the first embodiment will be explained below using FIGS. 1 to 5.

FIG. 1 shows an atomic force microscope 100 of the present embodiment. The atomic force microscope 100 includes a cantilever 102 having a probe 101 at the free end. This cantilever 102 is held by a holder 104, and the probe 101 is placed so as to face a sample 103. The sample 103 is held on a Z-scanner 107 through an unillustrated sample stage.

Above the cantilever 102, an optical lever sensor 106 for optically detecting a displacement of the cantilever 102 is placed. The optical lever sensor 106 comprises a laser-light source 106a to apply converged laser light 106b on a back surface of the cantilever 102, a multi-segment detector 106d to receive laser light 106c reflected from the back surface of the cantilever 102, and an operational amplifier 106e to calculate a displacement signal of the cantilever 102 based on an output signal of the multi-segment detector 106d and to output the displacement signal. The displacement signal of the cantilever 102 output from the operational amplifier 106e includes an alternate signal reflecting an oscillation of the cantilever described below. The displacement signal of the cantilever 102 is supplied to a Z-controller 113.

A piezoelectric element 105 is provided on the holder 104. The piezoelectric element 105 operates as an oscillator to oscillate the cantilever 102 through the holder 104. The piezoelectric element 105, which is controlled by an oscillating-signal generator 112, oscillates the cantilever 102 based on an oscillating signal output from the oscillating-signal generator 112. That is, the oscillation of the cantilever 102 is controlled by the oscillating-signal generator 112.

A Z-scanner 107 is to scan the sample 103 along a Z direction with respect to the cantilever 102. The Z-scanner 107 is mounted on an X-scanner 108a, which is mounted on a Y-scanner 108b. The Z-scanner 107 is controlled by the Z-controller 113. Specifically, the Z-controller 113 receives the displacement signal including the alternate signal reflecting the oscillation of the cantilever 102, to generate a Z-scanning signal for keeping, for example, an amplitude value of the displacement signal constant, causing the Z-scanner 107 to expand and contract along the Z direction based on the Z-scanning signal, so as to scan the sample 103 along the Z direction with respect to the cantilever 102. That is, a relative distance between the cantilever 102 and the sample 103 along the Z direction is controlled by the Z-controller 113. The Z-scanning signal generated by the Z-controller 113 is supplied also to a sample-information acquiring unit 115.

A raster-scanning controller 108 comprises an X-scanner 108a, a Y-scanner 108b, and an XY-scanning controller 108c.

The X-scanner 108a and the Y-scanner 108b are to raster scan the sample 103 across an XY plane with respect to the cantilever 102. The X-scanner 108a and the Y-scanner 108b are controlled by the XY-scanning controller 108c. The X-scanner 108a and the Y-scanner 108b are displaced along the X-direction and a Y-direction based on the X-scanning signal and a Y-scanning signal output from the XY-scanning controller 108c, respectively, so as to raster scan the sample 103 across the XY plane with respect to the cantilever 102.

A controller 110 includes an interaction controller 111, the XY-scanning controller 108c, a raster-scanning-information generator 114, and a sample-information acquiring unit 115.

The raster-scanning-information generator 114 generates raster scanning information necessary for desired raster scanning. The raster scanning information is supplied to the XY-scanning controller 108c, a relative-speed-information generator 118, and the sample-information acquiring unit 115. The raster scanning information includes at least one of scanning area information concerning a scanning area of the raster scanning and scanning frequency information concerning a scanning frequency of the raster scanning. In the present embodiment, since the frequency is an inverse of a cycle, the scanning frequency information concerning a scanning frequency of the raster scanning may be replaced with scanning cycle information concerning a scanning cycle of the raster scanning.

Herein, the scanning area information concerning the scanning area of the raster scanning, and the scanning frequency information concerning the scanning frequency of the raster scanning will be explained.

FIG. 2 shows a locus of relative raster scanning of the probe 101 with respect to the sample 103. The locus of the raster scanning is a conventional and common one. In FIG. 2, a main scanning line direction of the raster scanning (a direction in which the scanning speed is faster) is regarded as an X-direction.

Figure 3:
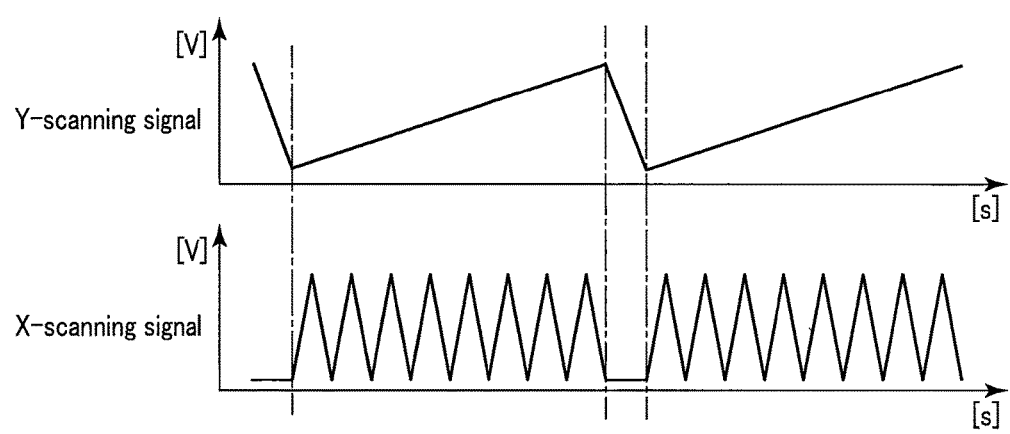
FIG. 3 shows waveforms of an X-scanning signal and a Y-scanning signal for causing an X-scanner and a Y-scanner to perform the raster scanning shown in FIG. 2.
Figure 4:
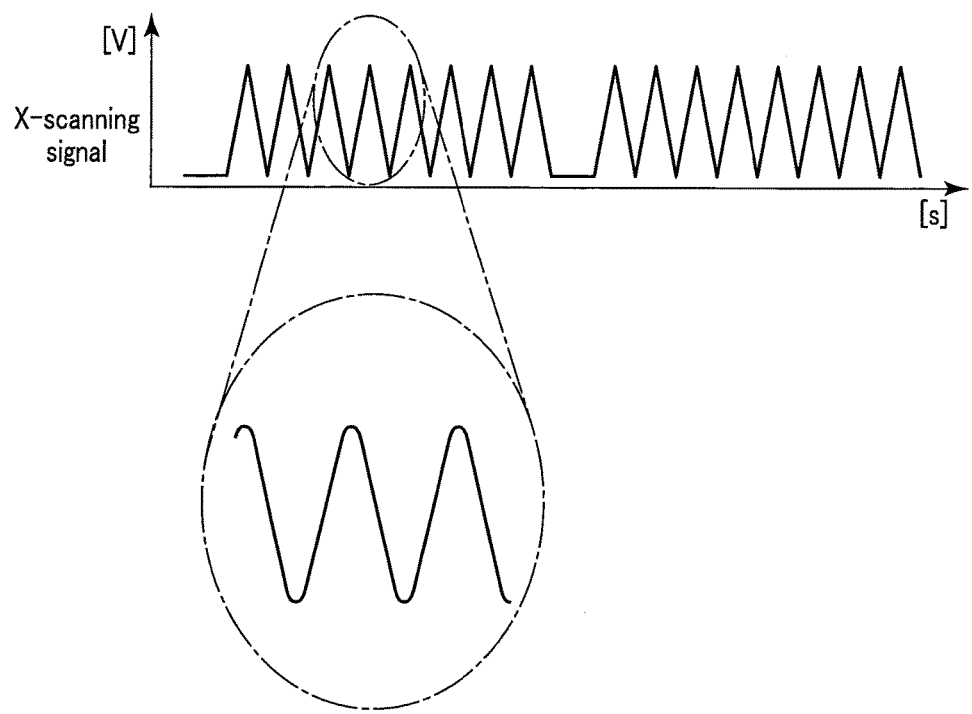
FIG. 4 shows an enlarged part of the X-scanning signal in FIG. 3.

FIG. 3 shows waveforms of the X-scanning signal and the Y-scanning signal for causing the X-scanner 108a and the Y-scanner 108b to perform the raster scanning shown in FIG. 2. As shown in FIG. 4, the X-scanning signal in FIG. 3 is rounded at portions where the signal changes from an increase to a decrease. This is for reducing harmonic components of the X-scanning signal, leading to an effect of reducing vibration noise attributable to scanning of the X-scanner 108a and the Y-scanner 108b, which are operated by the X-scanning signal and the Y-scanning signal.

Figure 5:
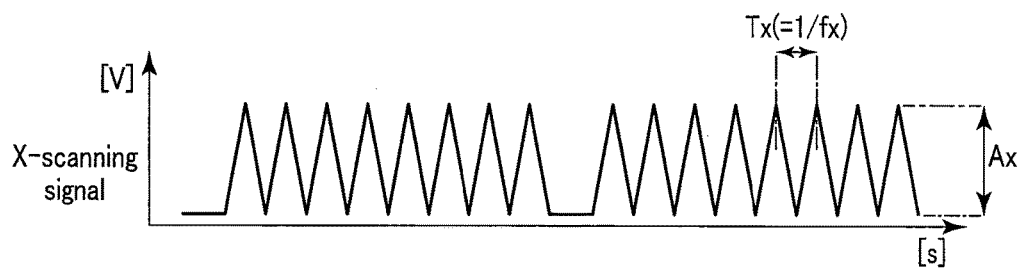
FIG. 5 shows an example of scanning area information concerning a scanning area of the raster scanning, and scanning frequency information concerning a scanning frequency of the raster scanning.

FIG. 5 shows an example of the scanning area information concerning the scanning area of the raster scanning, and the scanning frequency information concerning the scanning frequency of the raster scanning, which are included in the raster scanning information.

In FIG. 5, the scanning area information concerning the scanning area of the raster scanning is, for example, Ax, which is a total amplitude of the X-scanning signal. The Ax is substantially proportional to the size of the scanning area in the X-direction of the raster scanning. When the Ax is zero, the scanning area in the X-direction of the raster scanning also is zero. That is, the Ax being zero means a stop of the raster scanning. In the present embodiment, although the scanning area in the X-direction of the raster scanning is used as an example of the scanning area information concerning the scanning area of the raster scanning, the scanning area in the Y-direction of the raster scanning may be used. This is because, in general, a scanning area in the X-direction of the raster scanning and a scanning area in the Y-direction of the raster scanning are in a positive relationship.

In FIG. 5, the scanning frequency information concerning the scanning frequency of the raster scanning is, for example, a scanning frequency fx of the X-scanning signal. An inverse of the scanning frequency fx is equal to a scanning cycle Tx of the X scanning signal. That is, a relationship of Tx=1/fx is present between fx and Tx. When the fx is zero, it means a stop of scanning in the X-direction of the raster scanning. That is, the fx being zero means a stop of the raster scanning itself. In the present embodiment, although the scanning frequency (or the scanning cycle) in the X-direction of the raster scanning is used as an example of the scanning frequency information concerning a scanning frequency of the raster scanning, the scanning frequency (or the scanning cycle) in the Y-direction of the raster scanning may be used. This is because, in general, the scanning frequency (or the scanning cycle) in the X-direction of the raster scanning and the scanning frequency (or the scanning cycle) in the Y-direction of the raster scanning are in a positive relationship.

The XY-scanning controller 108c generates an X-scanning signal and a Y-scanning signal based on the raster scanning information. Therefore, the raster scanning is controlled by the raster-scanning controller 108 comprising the X-scanner 108a, Y-scanner 108b, and XY-scanning controller 108c, based on the raster scanning information.

The interaction controller 111 comprises the oscillating-signal generator 112, and the Z-controller 113. Therefore, the piezoelectric element 105 is controllable by the interaction controller 111 comprising the oscillating-signal generator 112. That is, the interaction controller 111 can control the oscillation of the cantilever 102. The Z-scanner 107 also is controllable by the interaction controller 111 comprising the X-controller 113. That is, the interaction controller 111 can control a relative distance between the cantilever 102 and the sample 103 along the Z-direction.

The interaction controller 111 comprises the relative-speed-information generator 118. The relative-speed-information generator 118 generates relative speed information corresponding to a relative speed between the cantilever 102 and the sample 103 across the XY-plane. The relative speed information corresponding to the relative speed between the cantilever 102 and the sample 103 across the XY-plane is equal to relative speed information corresponding to a relative speed between the probe 101 and the sample 103 across the XY-plane.

Herein, although it is impossible to obtain an absolute value of the relative speed singularly from the total amplitude Ax of the X-scanning signal and the scanning frequency fx of the X-scanning signal included in the raster scanning information, they can be treated as relative information of the relative speed. That is, a decision to increase or decrease the relative speed is possible. Therefore, as relative speed information, the Ax, which is the total amplitude of the X-scanning signal, or the scanning frequency fx of the X-scanning signal may be used alone. Since the relative speed is substantially equal to an multiplied value of the scanning area and the scanning frequency, i.e., a value obtained by dividing the scanning area by the scanning cycle, information obtained by multiplying the scanning area information concerning the scanning area of the raster scanning and the scanning cycle information concerning the scanning frequency of the raster scanning may be used as the relative speed information. The multiplied information can also be treated as information showing an absolute value of a change in relative speed, as well as the relative information of the relative speed.

Furthermore, the interaction controller 111 changes, for example, amplitude of the oscillation of the cantilever 102, or a relative distance between the cantilever 102 and the sample 103 along the Z direction, based on the relative speed information.

For example, if the amplitude of the oscillation of the cantilever 102 changes, or the relative distance between the cantilever 102 and the sample 103 along the Z direction changes, the strength of a mechanical interaction between the probe 101 and the sample 103 relatively changes. Specifically, if the amplitude of the oscillation of the cantilever 102 increases, the strength of the mechanical interaction between the probe 101 and the sample 103 relatively increases, and if the amplitude of the oscillation of the cantilever 102 decreases, the strength of the mechanical interaction between the probe 101 and the sample 103 relatively decreases. If the relative distance between the cantilever 102 and the sample 103 along the Z direction increases, the strength of the mechanical interaction between the probe 101 and the sample 103 relatively decreases, and if the relative distance between the cantilever 102 and the sample 103 along the Z direction decreases, the strength of the mechanical interaction between the probe 101 and the sample 103 relatively increases.

If the relative speed information indicates a relative decrease in relative speed between the cantilever 102 and the sample 103 across the XY-plane, the interaction controller 111 relatively reduces the strength of the mechanical interaction between the probe 101 and the sample 103, for example, by reducing the amplitude of the oscillation of the cantilever 102, or by increasing the relative distance between the cantilever 102 and the sample 103 along the Z direction. If the relative speed information indicates a relative increase (i.e., a return) in relative speed between the cantilever 102 and the sample 103 across the XY-plane, the interaction controller 111 relatively increases the strength of the mechanical interaction between the probe 101 and the sample 103, for example, by increasing the amplitude of the oscillation of the cantilever 102, or by reducing the relative distance between the cantilever 102 and the sample 103 along the Z direction.

In this way, the interaction controller 111 can control the strength of the mechanical interaction between the probe 101 and the sample 103 based on the relative speed information. Concretely, the interaction controller 111 relatively reduces the strength of the mechanical interaction between the probe 101 and the sample 103 if the relative speed information indicates a relative decrease in relative speed, and relatively increases the strength of the mechanical interaction between the probe 101 and the sample 103 if the relative speed information indicates a relative increase in relative speed.

The sample-information acquiring unit 115 generates sample information, for example, image data for mapping surface shape information, based on the Z-scanning signal and the raster scanning information supplied.

A sample-information display 116 displays the image data generated by the sample-information acquiring unit 115.

An input unit 117 is connected to the controller 110. The input unit 117 is for installing, in the controller 110, for example, a program of the controlling method disclosed herein, designating an observation area, and giving a command such as a start of observation and an end of observation to the controller 110.

Next, a flow of operations of the atomic force microscope thus configured will be explained.

The oscillating-signal generator 112 outputs an oscillating signal, to supply the oscillating signal to the piezoelectric element 105, which operates as the oscillator.

The piezoelectric element 105 oscillates the cantilever 102 near its mechanical resonance frequency, based on the oscillating signal.

The optical lever sensor 106 placed above the cantilever 102 detects a displacement of the cantilever 102, to supply the displacement signal including an alternate signal reflecting the oscillation of the cantilever 102 to the Z-controller 113.

A raster-scanning-information controller 114 generates raster scanning information necessary for desired raster scanning. The raster scanning information is supplied to the XY-scanning controller 108c, the interaction controller 111, and the sample-information acquiring unit 115. The raster scanning information includes scanning area information concerning the scanning area of the raster scanning (e.g., the total amplitude Ax of the X-scanning signal) and scanning frequency information concerning the scanning frequency of the raster scanning (e.g., the scanning frequency fx of the X-scanning signal).

The XY-scanning controller 108c outputs the X-scanning signal and the Y-scanning signal based on the raster scanning information.

The X-scanner 108a and Y-scanner 108b respectively receive the X-scanning signal and the Y-scanning signal to raster scan the sample 103 across the XY-plane with respect to the cantilever 102.

Concurrently with the raster scanning, the Z-controller 113 within the interaction controller 111 receives the displacement signal including the alternate signal reflecting the oscillation of the cantilever 102, to generate the Z-scanning signal for keeping, for example, an amplitude value of the displacement signal constant, causing the Z-scanner 107 to expand and contract in the Z direction based on the Z-scanning signal, so as to scan the sample 103 along the Z direction with respect to the cantilever 102. The Z-scanning signal is supplied also to the sample-information acquiring unit 115.

Furthermore, concurrently with the raster scanning, the relative-speed-information generator 118 generates relative speed information corresponding to a relative speed between the cantilever 102 and the sample 103 across the XY-plane, based on the raster scanning information supplied.

The interaction controller 111 controls the strength of the mechanical interaction between the probe 101 and the sample 103 based on the relative speed information.

The sample-information acquiring unit 115 generates sample information, for example, image data for mapping surface shape information, based on the Z-scanning signal and the raster scanning information supplied.

The sample-information display 116 displays the image data generated by the sample-information acquiring unit 115.

Herein, a case where conditions for the raster scanning, i.e., contents of the raster scanning information are changed is considered. For example, if the total amplitude Ax of the X-scanning signal increases or decreases, or if the scanning frequency fx of the X-scanning signal increases or decreases, the relative speed information indicates that the relative speed between the cantilever 102 and the sample 103 relatively increases or decreases. Since the relative speed is proportional to a product of the total amplitude Ax and the scanning frequency fx of the X-scanning signal, a change rate of the relative speed is determined by a product of a change rate of the total amplitude Ax and a change rate of the scanning frequency fx of the X-scanning signal. For example, if the total amplitude Ax of the X-scanning signal becomes half, the relative speed information indicates that the relative speed becomes half, and if the scanning frequency fx of the X-scanning signal becomes one-fourth, the relative speed information indicates that the relative speed becomes one-fourth. Furthermore, if the total amplitude Ax of the X-scanning signal becomes half and the scanning frequency fx of the X-scanning signal become one-fourth, the relative speed information indicates that the relative speed becomes one-eighth.

The interaction controller 111 relatively reduces the strength of a mechanical interaction between the probe 101 and the sample 103 based on the relative speed information, if the relative speed relatively decreases, and relatively increases the strength of the mechanical interaction between the probe 101 and the sample 103, if the relative speed relatively increases. Herein, it is desired that the rate of increase or decrease of the interaction is set to be the same as the rate of relative increase or decrease of the relative speed. For example, if the relative speed becomes half, it would be advisable to set the interaction to be half, and if the relative speed becomes double, it would be advisable to set the interaction to be double.

With the above configuration, in the present embodiment, the interaction controller 111 controls the oscillation of the cantilever 102, or the relative distance between the cantilever 102 and the sample 103 along the Z direction, so that the strength of the interaction can be controlled. When the relative speed decreases, the strength of the interaction between the cantilever 102 and the sample 103 is relatively decreased, for example, by reducing the amplitude of the oscillation of the cantilever 102 or by increasing the relative distance between the cantilever 102 and the sample 103 along the Z direction.

Therefore, according to the atomic force microscope of the first embodiment, since the interaction is controlled based on the relative speed information, when the relative speed decreases, the strength of the interaction is relatively reduced, resulting in a reduction in deformation of a soft sample such as a gel.

Second Embodiment

In a sample such as a gel, the characteristic that the deformation of the sample becomes large as the time during which an interaction acts becomes long also causes another problem other than the problem discussed in the first embodiment.

The problem is attributable to the raster scanning. First, the raster scanning will be explained.

FIG. 2 shows the locus of the relative raster scanning of the probe 101 with respect to the sample 103. The locus of the raster scanning is a conventional and common one. In FIG. 2, the main scanning line direction of the raster scanning (the direction in which the scanning speed is faster) is regarded as the X-direction.

FIG. 3 shows the waveforms of the X-scanning signal and the X-scanning signal for causing the X-scanner 108a and the Y-scanner 108b to perform the raster scanning shown in FIG. 2. As shown in FIG. 4, the X-scanning signal in FIG. 3 is rounded at portions where the signal changes from an increase to a decrease. This is for reducing harmonic components of the X-scanning signal, leading to an effect of reducing vibration noise attributable to scanning of the X-scanner 108a and the Y-scanner 108b, which are operated by the X-scanning signal and the Y-scanning signal.

In the raster scanning, as can be seen from FIGS. 2 and 3, places where the scanning direction is reversed in the X-direction, which is the main scanning line direction, definitely present. Near the places where the scanning-direction is reversed, i.e., in areas near turn-around points (points at which the scanning direction is reversed) including the turn-around points in the X-direction of the raster scanning, the relative speed between a probe and a sample inevitably decreases. Particularly, in a case where the harmonic components are reduced as shown in FIG. 4, the areas where the relative speed decreases enlarges.

Figure 6:
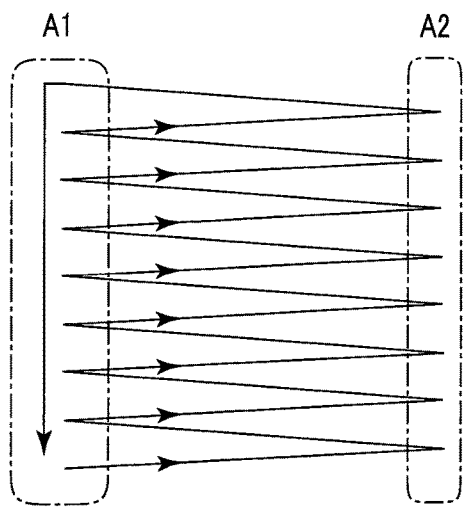
FIG. 6 shows, in addition to the locus of the raster scanning, scanning areas where a relative speed between a probe and a sample decreases.
Figure 7:
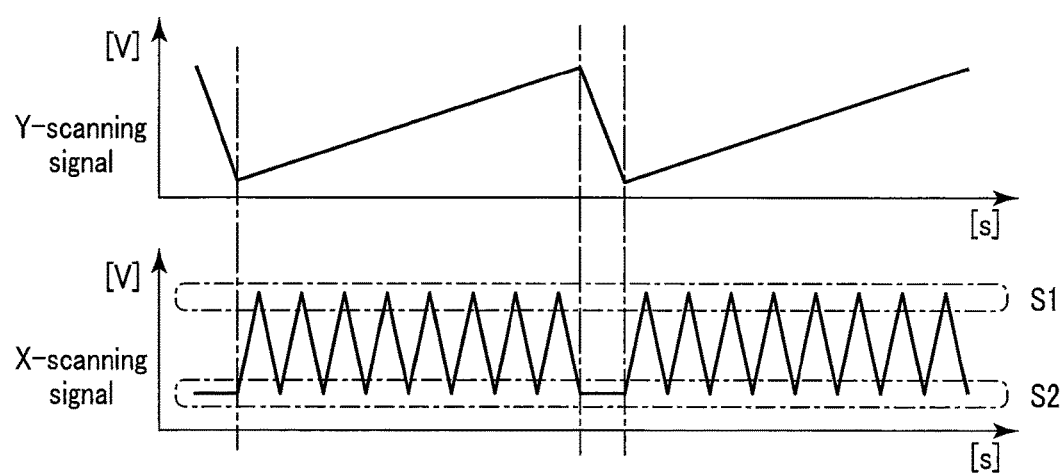
FIG. 7 shows signal regions respectively corresponding to the scanning areas where the relative speed between the probe and the sample decreases, in addition to the waveforms of the scanning signals for the raster scanning.

FIG. 6 shows, in addition to the locus of the raster scanning, the areas near the turn-around points (the points at which the scanning direction is reversed) including the turn-around points in the X-direction of the raster scanning shown in FIG. 2, i.e., scanning areas A1 and A2 where the relative speed between the probe 101 and the sample 103 across the XY-plane decreases. FIG. 7 shows signal regions S1 and S2 respectively corresponding to the scanning areas A1 and A2 where the relative speed between the probe 101 and the sample 103 decreases, in addition to the waveforms of the scanning signals for the raster scanning.

Figure 8:
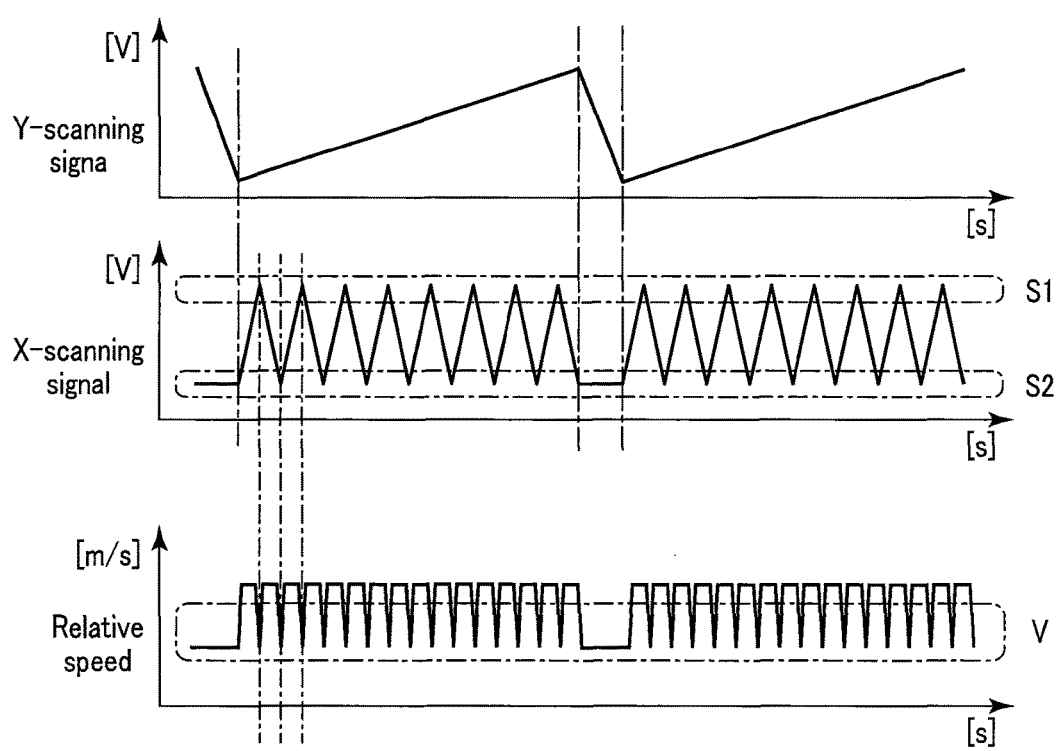
FIG. 8 shows a change in relative speed between the probe and the sample by the raster scanning, in addition to the waveforms of the scanning signals shown in FIG. 7.

FIG. 8 shows a change in relative speed between the probe 101 and the sample 103 by the raster scanning, in addition to the waveforms of the scanning signals shown in FIG. 7. The signal regions S1 and S2 correspond to a region V in the graph of the relative speed.

As can be seen from the above, the problem attributable to the raster scanning is that in the areas near the turn-around points (the points at which the scanning direction is reversed) including the turn-around points in the X-direction of the raster scanning, the relative speed inevitably decreases, so that deformation of the sample becomes large. If the deformation of the sample in the areas (the scanning areas A1 and A2 in FIG. 6) near the turn-around points (the points at which the scanning direction is reversed) in the X-direction becomes large, the vertical cross-sectional shape of an observed image of the sample appears like a flipped frying pan. That is, the vertical cross-sectional shape of the observed image of the sample reflects the height of the sample faithfully, except for both end portions thereof, however; at the both end portions, distortions are large, so that the height nearer the end portions is lower than the actual height of the sample.

This is a very significant problem in soft matter observation AFMs to observe soft samples such as a gel.

A second embodiment is to solve this problem, and the second embodiment will be explained below, using FIGS. 9 to 11.

FIG. 9 shows an atomic force microscope 200 of the present embodiment. In FIG. 8, members provided with the same reference signs as those of the members shown in FIG. 1 represent the same members, and explanations thereof are omitted herein. The atomic force microscope 200 of the present embodiment differs from the atomic force microscope 100 of the first embodiment shown in FIG. 1, in a controller 210, and in an interaction controller 211 (relative-speed-information generator 218) and a raster-scanning-information generator 214, included therein.

The raster-scanning-information generator 214 generates raster scanning information necessary for desired raster scanning. The raster scanning information is supplied to the XY-scanning controller 108c, the interaction controller 211, and the sample-information acquiring unit 115. The raster scanning information includes at least information on a scanning waveform of the raster scanning, for example, information on a scanning waveform of the X-scanning signal shown in FIG. 10 (or FIG. 3). Although it is desired that the raster scanning information includes information on the total amplitude Ax of the X-scanning signal and the scanning frequency fx of the X-scanning signal, in addition to the information on the scanning waveform of the X-scanning signal, the present embodiment will be explained on the assumption that the raster scanning information does not include these pieces of information.

The raster scanning information is supplied to the XY-scanning controller 108c, the interaction controller 211 (the relative-speed-information generator 218), and the sample-information acquiring unit 115.

Figure 10:
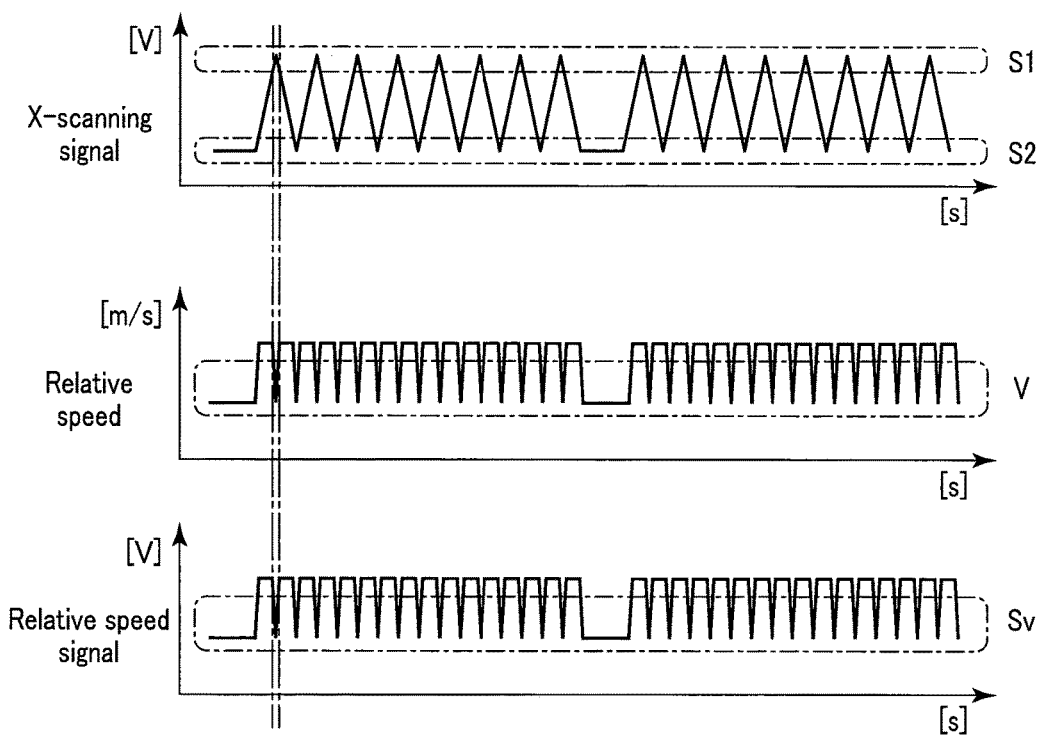
FIG. 10 shows a relative speed signal obtained by differentiating information on the scanning waveform of the X-scanning signal, in addition to the waveform of the X-scanning signal and the change in the relative speed shown in FIG. 8.

The relative-speed-information generator 218 within the interaction controller 211 differentiates information on the scanning waveform of the X-scanning signal included in the raster scanning information to generate a relative speed signal shown in FIG. 10, using it as the relative speed information.

The relative-speed-information generator 218 monitors the relative speed information. With the configuration, the relative-speed-information generator 218 can sense an increase or a decrease of the relative speed between the cantilever 102 and the sample 103, based on the relative speed information.

The relative speed signal shown in FIG. 10, which is the relative speed information, is to reflect the relative speed shown in FIG. 10 (or FIG. 8). A region Sv of the relative speed signal shown in FIG. 10 is a region corresponding to the region V of the relative speed. To determine the region Sv of the relative speed signal, it is unnecessary to know an absolute value of an actual relative speed, and the region Sv may be determined based on a relative change (change rate) of the relative speed. That is, the region Sv of the relative speed signal can be determined without the information on the total amplitude Ax of the X-scanning signal and the information on the scanning frequency fx of the X-scanning signal.

Furthermore, the interaction controller 211 changes amplitude of the oscillation of the cantilever 102, or a relative distance between the cantilever 102 and the sample 103 along the Z direction, for example, based on the relative speed information.

For example, if the amplitude of the oscillation of the cantilever 102 changes, or the relative distance between the cantilever 102 and the sample 103 along the Z direction changes, the strength of a mechanical interaction between the probe 101 and the sample 103 relatively changes. Specifically, if the amplitude of the oscillation of the cantilever 102 increases, the strength of the mechanical interaction between the probe 101 and the sample 103 relatively increases, and if the amplitude of the oscillation of the cantilever 102 decreases, the strength of the mechanical interaction between the probe 101 and the sample 103 relatively decreases. If the relative distance between the cantilever 102 and the sample 103 along the Z direction increases, the strength of the mechanical interaction between the probe 101 and the sample 103 relatively decreases, and if the relative distance between the cantilever 102 and the sample 103 along the Z direction decreases, the strength of the mechanical interaction between the probe 101 and the sample 103 relatively increases.

When the relative speed information indicates a relative decrease in relative speed between the cantilever 102 and the sample 103 across the XY-plane, for example, when the relative speed information enters the region Sv, in other words, when the relative speed information falls below a predetermined threshold value, the interaction controller 211 relatively reduces the strength of the mechanical interaction between the probe 101 and the sample 103, for example, by reducing the amplitude of the oscillation of the cantilever 102, or by increasing the relative distance between the cantilever 102 and the sample 103 along the Z direction. When the relative speed information indicates a return in relative speed between the cantilever 102 and the sample 103 across the XY-plane, for example, when the relative speed information goes out the region Sv, in other words, when the relative speed information exceeds the predetermined threshold value, the interaction controller 211 relatively increases the strength of the mechanical interaction between the probe 101 and the sample 103, for example, by increasing the amplitude of the oscillation of the cantilever 102, or by reducing the relative distance between the cantilever 102 and the sample 103 along the Z direction.

In this way, the interaction controller 211 can control the strength of the mechanical interaction between the probe 101 and the sample 103 based on the relative speed information. Concretely, the interaction controller 211 relatively reduces the strength of the mechanical interaction between the probe 101 and the sample 103, during the relative speed information is within the region Sv, in other words, during the relative speed information is less than the predetermined threshold value. In other words, the interaction controller 211 relatively reduces the strength of the mechanical interaction during the probe is within the relative speed decreasing areas where the relative speed decreases in the scanning between the probe 101 and the sample 103 in the main scanning direction, i.e. the X-direction.

With the above configuration, in the atomic force microscope of the present embodiment, the strength of a mechanical interaction between the probe 101 and the sample 103 is relatively reduced by the interaction controller 211 based on the relative speed information corresponding to the relative speed between the cantilever 102 and the sample 103, when the relative speed between the cantilever 102 and the sample 103 across the XY-plane relatively reduces.

Therefore, according to the atomic force microscope of the second embodiment, the problem that the deformation amount of a sample increases when the relative speed reduces in areas near the turn-around points (the points where the scanning direction is reversed) including the turn-around points in the X-direction of the raster scanning is avoided. As a result, deformation of soft samples such as a gel is reduced.

Figure 11:
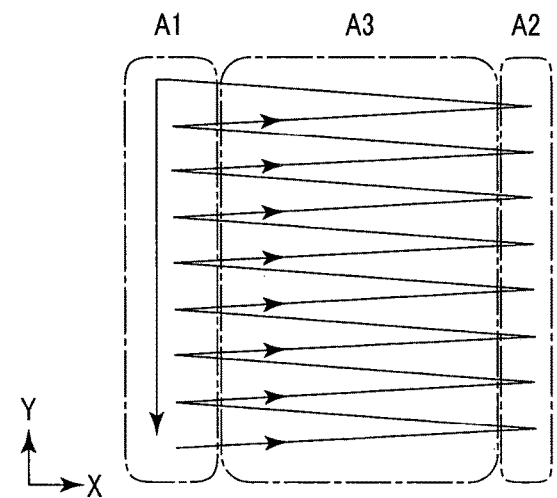
FIG. 11 shows scanning areas where the relative speed between the cantilever and the sample decreases, and an area in which the scanning areas are excluded from the overall scanning area.

In the atomic force microscope of the second embodiment, only sample information (e.g., image data) of an area without the "scanning areas A1 and A2 where the relative speed between the cantilever and the sample across the XY-plane decreases" shown in FIG. 6, i.e., an area A3 shown in FIG. 11 may be displayed on a sample-information display 116. That the sample-information acquiring unit 115 may generate sample information (e.g., image data) on the area A3, in which the scanning areas A1 and A2 where the relative speed between the cantilever and the sample reduces are excluded from the overall scanning area, to cause the sample-information display 116 to display it.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An atomic force microscope to acquire sample information by performing relative raster scanning between a cantilever and a sample across an XY-plane, while causing an interaction to be generated between a probe provided at a free end of the cantilever and the sample, the atomic force microscope comprising:
a raster-scanning-information generator to generate raster scanning information;
a raster-scanning controller to control the raster scanning based on the raster scanning information; and
an interaction controller to control strength of the interaction based on the raster scanning information,
the interaction controller relatively reducing the strength of the interaction, when a relative speed between the cantilever and the sample across the XY-plane of the raster scanning relatively decreases.

2. The atomic force microscope according to claim 1, wherein the interaction controller comprises a relative-speed-information generator to generate relative speed information corresponding to the relative speed between the cantilever and the sample based on the raster scanning information, and the interaction controller controls the strength of the interaction based on the relative speed information.

3. The atomic force microscope according to claim 2, wherein the raster scanning information includes at least one of information on a scanning area of the raster scanning and information on a scanning frequency of the raster scanning.

4. The atomic force microscope according to claim 3, wherein the raster scanning information includes both the information on the scanning area of the raster scanning and the information on the scanning frequency of the raster scanning, and the relative-speed-information generator generates the relative speed information based on information in which the information on the scanning area of the raster scanning is multiplied by the information on the scanning frequency of the raster scanning.

5. The atomic force microscope according to claim 4, wherein the raster scanning information includes at least information on a scanning waveform of the raster scanning, and the relative-speed-information generator generates the relative speed information based on information in which the information on the scanning waveform for controlling an XY-scanner is differentiated.

6. The atomic force microscope according to claim 1, wherein the interaction controller relatively increases the strength of the interaction, when the relative speed between the cantilever and the sample across the XY-plane of the raster scanning relatively increases.

7. The atomic force microscope according to claim 6, comprising:
a Z-scanner to relatively scan the cantilever and the sample along a Z direction perpendicular to the XY-plane, the Z-scanner being controlled by the interaction controller,
wherein the interaction controller relatively reduces the strength of the interaction by increasing a relative distance between the cantilever and the sample in the Z direction.

8. The atomic force microscope according to claim 6, comprising:

an oscillator to oscillate the cantilever, the oscillator being controlled by the interaction controller, wherein the interaction controller relatively reduces the strength of the interaction by decreasing an oscillation amplitude of the cantilever.

9. A method of controlling an atomic force microscope that acquires sample information by performing relative raster scanning between a cantilever and a sample across an XY-plane, while inducing an interaction between the sample and a probe provided at a free end of the cantilever, the method comprising:

relatively reducing a strength of the interaction, when a relative speed between the cantilever and the sample across the XY-plane of the raster scanning relatively decreases.

10. The method according to claim 9, wherein the relatively reducing the strength of the interaction includes acquiring relative speed information corresponding to the relative speed between the cantilever and the sample, and monitoring the relative speed information, so as to relatively reduce the strength of the interaction, when the relative speed information indicates a relative decrease of the relative speed.

11. The method according to claim 10, wherein the acquiring the relative speed information is performed based on at least one of information on a scanning area of the raster scanning and information on a scanning frequency of the raster scanning.

12. The method according to claim 11, wherein the acquiring the relative speed information is performed based on multiplied information of the scanning area of the raster scanning and the information on the scanning frequency of the raster scanning.

13. The method according to claim 12, wherein the acquiring the relative speed information is performed based on information in which information on a scanning waveform of the raster scanning is differentiated.

14. The method according to claim 1, further comprising relatively increasing the strength of the interaction, when the relative speed between the cantilever and the sample across the XY-plane of the raster scanning relatively increases.

* * * * *